United States Patent
Sakon et al.

(10) Patent No.: US 8,933,608 B2
(45) Date of Patent: Jan. 13, 2015

(54) COMMUTATOR MOTOR AND METHOD OF CONNECTING WINDINGS OF THE SAME

(71) Applicant: Panasonic Corporation, Osaka (JP)

(72) Inventors: Syouzou Sakon, Osaka (JP); Kazuo Toya, Osaka (JP); Yasuharu Uchida, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/131,707

(22) PCT Filed: Jul. 10, 2013

(86) PCT No.: PCT/JP2013/004260
§ 371 (c)(1),
(2) Date: Jan. 9, 2014

(87) PCT Pub. No.: WO2014/108942
PCT Pub. Date: Jul. 17, 2014

(65) Prior Publication Data
US 2014/0346916 A1 Nov. 27, 2014

(30) Foreign Application Priority Data
Jan. 10, 2013 (JP) .................. 2013-002272

(51) Int. Cl.
*H02K 13/04* (2006.01)
*H02K 3/28* (2006.01)
(Continued)

(52) U.S. Cl.
CPC .. *H02K 3/28* (2013.01); *H02K 3/12* (2013.01); *H02K 13/10* (2013.01); *H02K 23/26* (2013.01); *H02K 15/08* (2013.01)
USPC .......................................... 310/208; 310/234

(58) Field of Classification Search
CPC ..... H02K 13/04; H02K 13/006; H02K 13/14; H02K 3/50
USPC .................................... 310/208, 233, 234, 71
See application file for complete search history.

(56) References Cited

U.S. PATENT DOCUMENTS

| 4,975,612 | A | * | 12/1990 | Strobl ............................ 310/234 |
| 2004/0095036 | A1 | | 5/2004 | Yamamoto et al. |
| 2007/0257572 | A1 | * | 11/2007 | Nakano et al. .................. 310/71 |
| 2012/0319520 | A1 | | 12/2012 | Sakon et al. |

FOREIGN PATENT DOCUMENTS

| EP | 13 80 2214 | 10/2014 |
| JP | 02-142347 A | 5/1990 |

(Continued)

OTHER PUBLICATIONS

Partial Machine translation of WO2009/072280A1 (Jun. 2009).*
(Continued)

*Primary Examiner* — Michael Andrews
(74) *Attorney, Agent, or Firm* — RatnerPrestia (57) ABSTRACT

A commutator motor is configured such that an armature includes an armature core having teeth and slots, an armature coil, and a commutator having segments. The armature coil includes coil units in which windings are wound on the teeth, and jumper wire units for interconnecting between the coil units. Segment group includes first and second segments to which the coil units are connected, and a third segment to which only the jumper wire unit is connected. The first and second segments are disposed adjacent to each other, and the third segment is disposed next to the adjacent arrangement. The configuration includes the jumper wire unit that is wired from the third segment such that each of one part of the wire unit running to one side and the other part of the wire unit running to the other side is wired to pass through the same slot to interconnect between the coil units.

15 Claims, 7 Drawing Sheets

(51) Int. Cl.
*H02K 3/12* (2006.01)
*H02K 13/10* (2006.01)
*H02K 23/26* (2006.01)
*H02K 15/08* (2006.01)
*H02K 13/14* (2006.01)
*H02K 3/50* (2006.01)

(56) References Cited

FOREIGN PATENT DOCUMENTS

| | | |
|---|---|---|
| JP | 06-077474 U | 10/1994 |
| JP | 09-322484 A | 12/1997 |
| JP | 10-248214 A | 9/1998 |
| JP | 2004-88902 A | 3/2004 |
| JP | 2006-325318 A | 11/2006 |
| WO | WO 2007/015499 A1 | 2/2007 |
| WO | WO 2009/072280 A1 | 6/2009 |
| WO | WO 2009072280 A1 * 6/2009 ............ H02K 23/30 |
| WO | WO 2011/121991 A1 | 10/2011 |

OTHER PUBLICATIONS

Japanese International Search Report for Application No. PCT/JP2013/004260, dated Aug. 27, 2013.

* cited by examiner

COMMUTATOR MOTOR AND METHOD OF CONNECTING WINDINGS OF THE SAME

This Application is a U.S. National Phase Application of PCT International Application PCT/JP2013/004260.

TECHNICAL FIELD

The present invention relates to commutator motors having winding cores and commutators, and to a method of connecting windings of the motors. For example, it relates to the commutator motors for use in automotive electrical equipment and electrical power tools, and to the method of connecting the windings of the motors.

BACKGROUND ART

Motors for use in electrical equipment mounted in automobiles, for example, are required to have high reliability as well as compact size and reduced weight.

One of the motors of this type is a commutator motor which has brushes and a commutator. The commutator motor generally includes a stator which forms a magnetic field and a rotor which is disposed to face the stator via an annular gap. The rotor is equipped with a so-called armature including the commutator. The armature is supplied with electric power to rotationally drive the commutator motor. Moreover, to supply the power to the armature, brushes are disposed which are connected to an external direct current power supply. Such the brushes are in contact with the commutator to supply the power to the armature. Moreover, the rotor includes the commutator that is configured with a plurality of commutator pieces (segments) disposed in an annular or cylinder shape, as well as an iron core on which windings are wound. Furthermore, for the commutator, hook-type commutator is commonly used which includes the commutator pieces, each having a hook to connect the windings. Following a predetermined method of connecting wires, the armature is formed in such a way that the windings are wound on the iron core, with the windings being connected to the hooks by hooking or winding them on the hooks.

In connecting the windings to the hooks in the hook-type commutator, a technique for winding the winding on the hook in an α-shape has been generally used. Here, "winding the winding on the hook in an α-shape" as referred herein means a way of winding the winding on the hook in a letter "α" motion. As an example of such the winding-on-a-hook, a technology has been proposed to provide stable wire spacings when the windings are wound on the hooks in the α-shape (see Patent Literature 1, for example). In the technology, step heights are disposed in hook-root winding parts such that, in each of the hook-root winding parts, the outer peripheral surfaces of the right and left sides are different in height from each other.

Moreover, in the commutator motor, a technology has been proposed which is aimed at improving driving efficiency and reducing its size and weight, by devising a different wire connection structure of the windings (see Patent Literature 2, for example). Next, conventional examples of such the wire connection structure of the windings will be described.

First, in the conventional examples, the armature coil is configured including a plurality of coil units and a plurality of jumper wire units. Here, the coil units are coils wound on teeth. The jumper wire units are wires to interconnect electrically between the coil units. Moreover, in a segment group of the commutator, the segments are divided into three types: a first segment connected with one end of the coil unit, a second segment connected with the other end of the coil unit, and a third segment connected only with the jumper wire unit. The first segment and the second segment are arranged adjacent to each other. Next to this adjacent arrangement, the third segment is arranged. Then, the armature coil is configured including the jumper wire units that pass through slots to interconnect between the coil units.

Figure 5A:
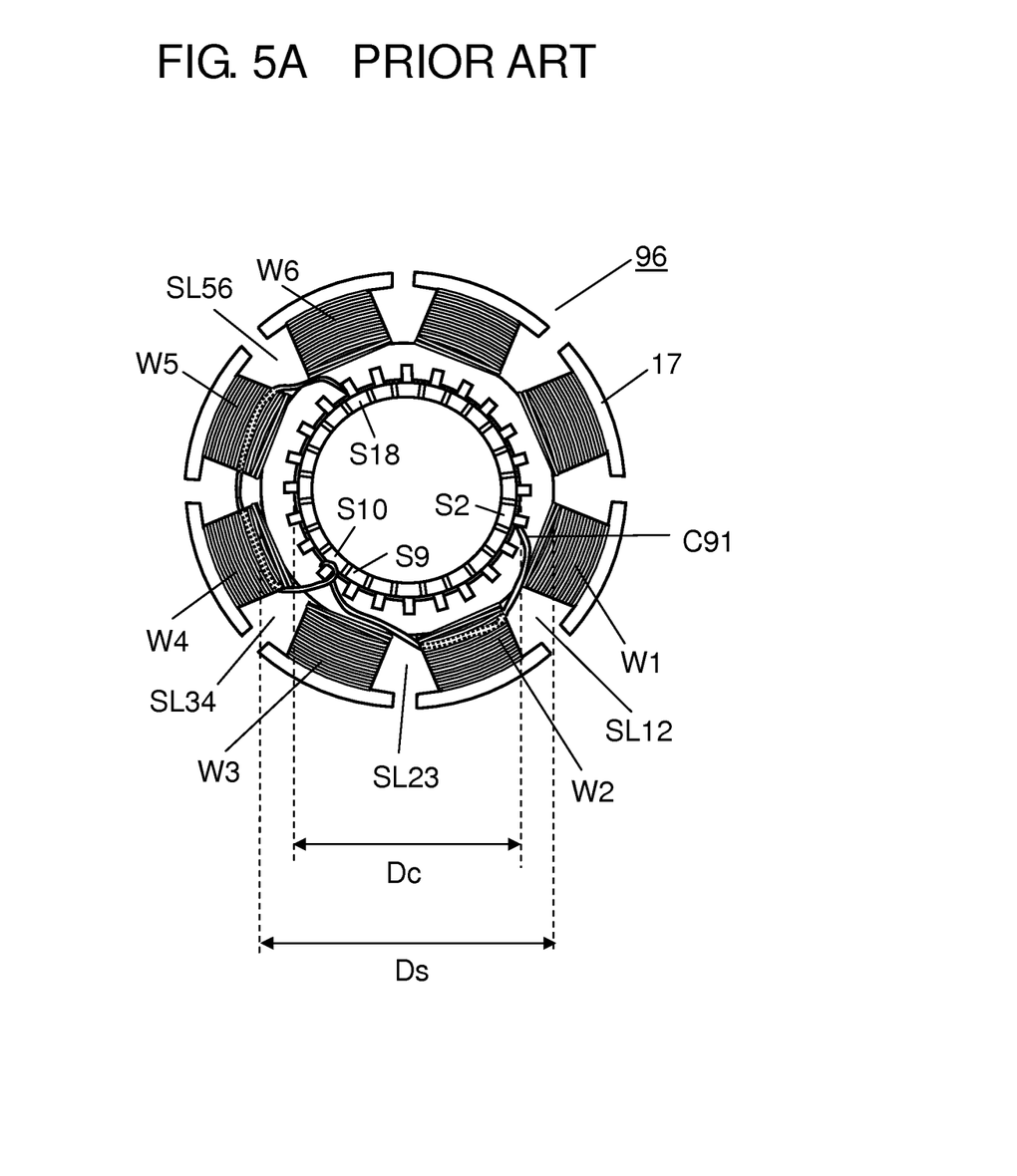
FIG. 5A is a top view illustrating an example of a wire connection of a conventional jumper wire unit.
Figure 5B:
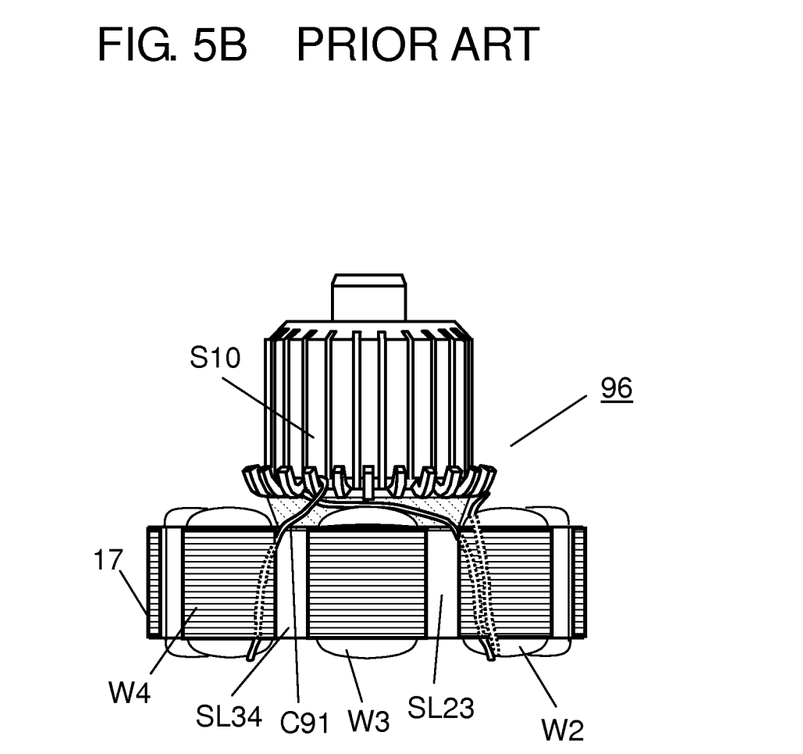
FIG. 5B is a side-elevational view illustrating the example of the wire connection of the conventional jumper wire unit.

FIGS. 5A and 5B are views of one example of the wire connection of such the conventional jumper wire units. FIG. 5A is a top view of conventional armature 96 while FIG. 5B is a side-elevational view of armature 96. Note that, in FIGS. 5A and 5B, only one jumper wire unit is exemplified for the sake of brevity.

As shown in FIGS. 5A and 5B, jumper wire unit C91, which comes from first segment S2 disposed on the upper surface of armature core 17, passes through slot SL12 between coil unit W1 and coil unit W2 to reach the lower surface side of armature core 17.

Moreover, jumper wire unit C91 passes under the lower surface side of coil unit W2, and passes through slot SL23 between coil unit W2 and coil unit W3 to reach the upper surface side. Then, jumper wire unit C91 is wound on the hook of third segment S10 in an α-shape and is then connected to third segment S10.

Next, jumper wire unit C91 exits from third segment S10, and passes through slot SL34 between coil unit W3 and coil unit W4 to reach the lower surface side of armature core 17.

Furthermore, jumper wire unit C91 passes under the lower surface sides of coil unit W4 and coil unit W5, and passes through slot SL56 between coil unit W5 and coil unit W6 to reach the upper surface side. Then, jumper wire unit C91 is connected to second segment S18.

In this way, the conventional commutator motor is configured including the wire connection in which the jumper wire unit passes through the slots to reach the third segment.

As described in the above conventional example, when the winding is connected to the third segment, the winding of the wire unit on the hook in the α-shape allows ease of the method of connecting the windings and secured connection quality. However, there has been a problem that the wire unit tends to come into in contact with the hooks of the segments adjacent to the third segment, resulting in insufficient wiring quality. In particular, as shown in FIGS. 5A and 5B, the closer diameter Dc of the commutator becomes to inner-peripheral diameter Ds of the slots of the iron core, the more easily such the contact occurs. One example of this is such that, like the route of jumper wire unit C91 from third segment S10 to slot SL34 shown in FIGS. 5A and 5B, jumper wire unit C91 tends to be wired to lie close to the hook of segment S9 and wired to run into below the underside of the hook of segment S9. This results in the tendency for the wire unit to suffer contact at this point. Then, the jumper wire unit part of the winding comes in contact with the hook to cause damage to the winding, resulting in easy occurrence of insulation failures and short circuit failures at the contact point.

Moreover, when such the commutator motor is mounted in an automobile, there has been a possibility that such the contact occurs due also to vibrations because the windings are subjected to vibrations from the automobile in addition to ones from the motor itself.

CITATION LIST

Patent Literatures

Patent Literature 1: Japanese Patent Unexamined Publication No. H09-322484

Patent Literature 2: WO 2011/121991

SUMMARY OF THE INVENTION

A commutator motor according to the present invention includes a stator having a plurality of field poles, an armature, and brushes in sliding contact with segments to supply electric power to armature coils. Moreover, the armature includes an armature core having a plurality of teeth and slots respectively interposed between the teeth, the armature coil formed of a winding wound on the armature core, and commutator having segment group configured with a plurality of segments. The armature coil includes a plurality of coil units, each formed of the winding wound on the teeth, and a plurality of jumper wire units, each interconnecting electrically between the coil units. The segment group includes a first segment connected with one end of the coil unit, a second segment connected with the other end of the coil unit, and a third segment connected only with the jumper wire unit. The first segment and the second segment are arranged adjacent to each other. Next to this adjacent arrangement, the third segment is arranged. Then, the commutator motor according to the present invention is configured such that the plurality of the jumper wire units includes the jumper wire unit that mutually connects between the coil units, by wiring the wire unit in such a manner that: Each of the parts, i.e. one part running to one side and the other part running to the other side, of the jumper wire unit starting from the third segment is wired to pass through the same slot together with each other.

Moreover, a method of connecting windings according to the present invention is one for connecting the windings of a commutator motor. The commutator motor includes a stator having a plurality of field poles, an armature, and brushes in sliding contact with segments to supply electric power to armature coil. Moreover, the armature includes an armature core having a plurality of teeth and slots respectively interposed between the teeth, the armature coil formed of a winding wound on the armature core, and commutator having segment group configured with a plurality of segments. The armature coil includes a plurality of coil units, each formed of the windings wound on the teeth, and a plurality of jumper wire units, each interconnecting electrically between the coil units. The segment group includes a first segment connected with one end of the coil unit, a second segment connected with the other end of the coil unit, and a third segment connected only with the jumper wire unit. The first segment and the second segment are arranged adjacent to each other. Next to this adjacent arrangement, the third segment is arranged. Then, the method of connecting the windings includes wiring the jumper wire unit for interconnecting between the coil units in such a manner that: Each of the parts, i.e. one part running to one side and the other part running to the other side, of the jumper wire unit starting from the third segment is wired to pass through the same slot together with each other.

With this configuration, the jumper wire unit is not wired in the directions toward the segments adjacent to the third segment, but is wired such that both the parts, i.e. the one part running to one side and the other part running to the other side, of the jumper wire unit pass through the same slot together with each other. This can suppress occurrence of such a wire connection failure in which the jumper wire unit comes in contact with the hooks of the segments adjacent to the third segment.

In this way, the commutator motor and the method of connecting the windings of the motor according to the present invention allows the suppression of the occurrence of wire connection failures in which the jumper wire units come in contact with the hooks of the segments adjacent to the third segments. This results in a reduction in the occurrence of insulation failures of the windings and short circuit failures at the contact points in the armature.

DESCRIPTION OF EMBODIMENTS

Hereinafter, embodiments according to the present invention will be described with reference to the accompanying drawings.

Exemplary Embodiments

Figure 1:
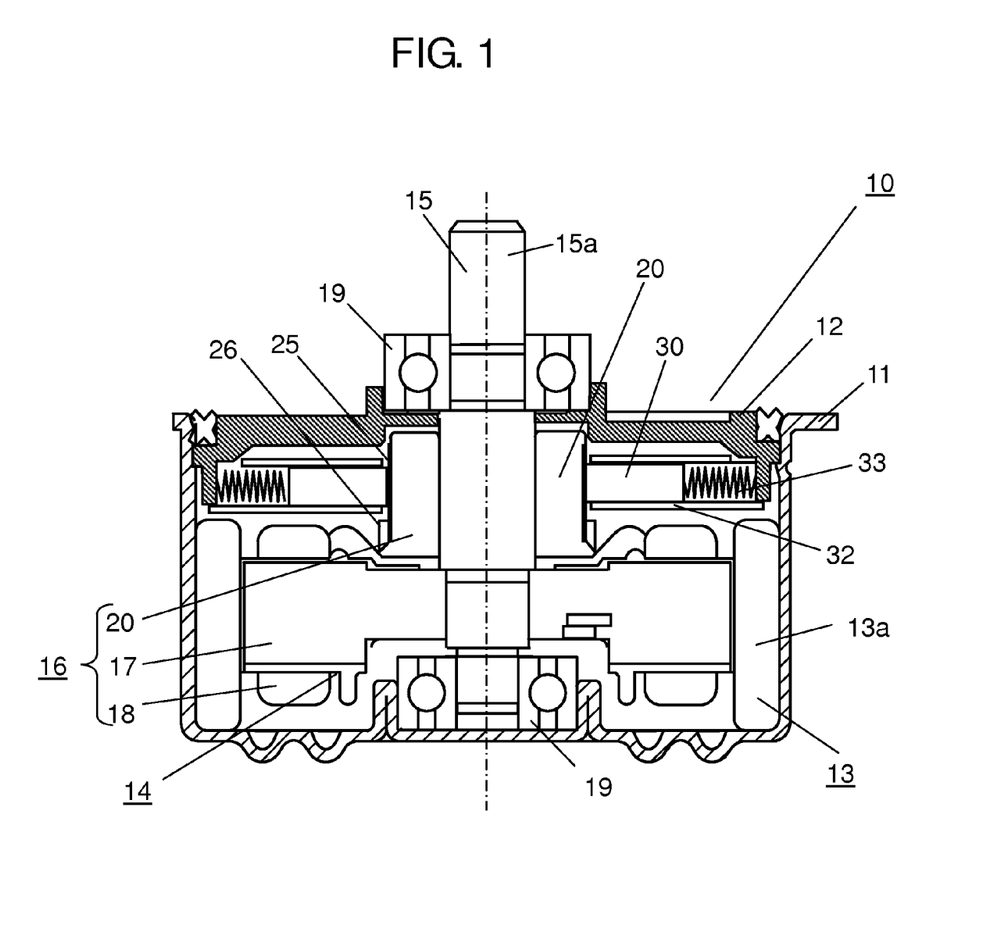
FIG. 1 is a cross-sectional view of a commutator motor according to an embodiment of the present invention.

FIG. 1 is a cross-sectional view of commutator motor 10 according to an embodiment of the present invention.

As shown in FIG. 1, commutator motor 10 is configured to be surrounded by frame 11 having a cup shape and bracket 12 attached to close an opening of frame 11.

First, in bracket 12, brush holding parts are formed to hold a pair of brush pieces 30. Each of the brush pieces 30 is arranged and disposed in a straight line. Brush pieces 30 are accommodated in brush boxes 32. In brush boxes 32, brush pieces 30 are pressed against commutator 20 by springs 33.

Moreover, on the inner wall of frame 11, permanent magnets 13a are fastened. Permanent magnets 13a are cylindrically disposed and subjected to the predetermined number of magnetizations in a circumferential direction. In this way, stator 13 is configured with permanent magnets 13a held on the inner wall of frame 11. Then, in the inner peripheral side of permanent magnets 13a, rotor 14 holding armature 16 is accommodated.

Rotor 14 includes shaft 15, armature core 17, windings 18, and commutator 20. Shaft 15 penetrates the centers of armature core 17 and commutator 20. Both near-end parts of the shaft 15 are respectively supported by shaft bearings 19. With this configuration, rotor 14 is rotatably supported inside the inner periphery of stator 13. Then, one end of shaft 15 protrudes from bracket 12 to the outside, serving as output shaft 15a.

Moreover, in rotor 14, armature core 17 is disposed to face permanent magnets 13a via an annular gap. Armature core 17 is formed by stacking magnetic steel sheets. On the armature core 17, windings 18 are wound to form armature coil. Then, in the one end surface side of armature core 17, commutator 20 having a plurality of segments 25 is fixed to shaft 15. Each of segments 25 is a commutator piece formed with a metal plate long in the shaft 15 direction. The segments are arranged in the outer periphery of the bodies of commutator 20, being angularly spaced at regular intervals in the circumferential direction. Moreover, in the armature core 17 side of each of segments 25, hook 26 serving as a winding connecting part is formed to electrically connect winding 18 to segment 25. Winding 18 is hooked on hook 26 and is then subjected to a predetermined treatment, resulting in the electrical connection of winding 18 to hook 26. Commutator 20 and armature core 17 on which windings 18 are wound are configured in this way to form armature 16. Moreover, both brush pieces 30 are in contact with commutator 20, being pressed by springs 33. That is, brush pieces 30 connected electrically to an external power supply are in sliding contact with segments 25 of commutator 20, which allows power supply to windings 18 of rotor 14. With this configuration, torque is generated between permanent magnets 13a forming a magnetic field and the armature coils configured by windings 18 wound on armature core 17, which causes rotor 14 to rotate inside stator 13.

Next, a more detailed configuration of commutator motor 10 will be described focusing on armature 16.

Figure 2:
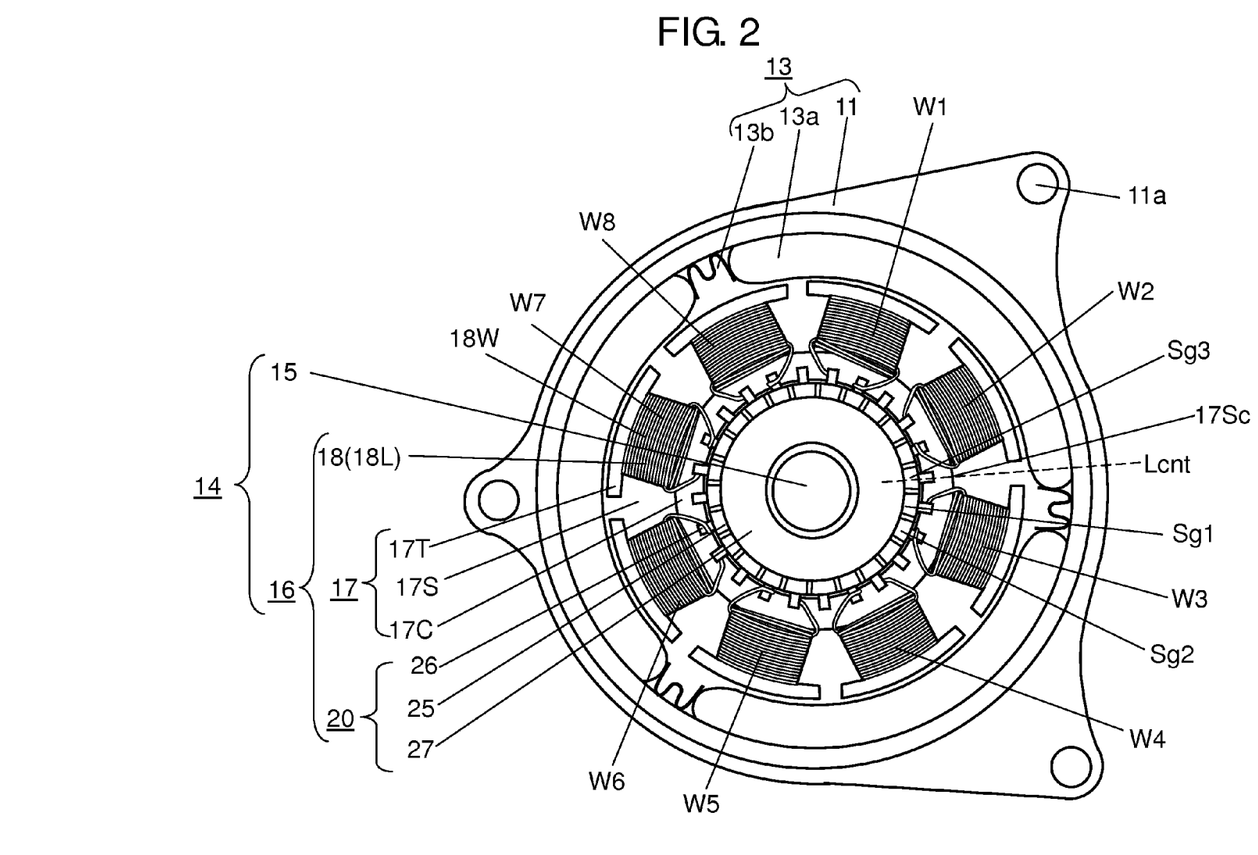
FIG. 2 is a top view of the commutator motor with a bracket of the motor being removed.

FIG. 2 is a top view of commutator motor 10 according to the embodiment of the invention, with bracket 12 of the motor being removed. In FIG. 2, frame 11 configuring stator 13 has mounting holes 11a at three locations thereof, and holds permanent magnets 13a on the inner peripheral surface of a cup-shaped part of the frame. In the embodiment, one example is described in which three permanent magnets 13a are held and magnet fixing springs 13b are respectively interposed between the magnets. In this way, permanent magnets 13a are in contact with and fixed to the inner peripheral surface of frame 11, which configures stator 13. Then, each of permanent magnets 13a is magnetized to have a pair of field poles, i.e. an N-pole and an S-pole. Therefore, in the embodiment, the number of the thus-magnetized field poles is six over the entire circumference. Note, however, that permanent magnets 13a may be configured to be a ring-shaped one, the inner wall of which is magnetized into six poles such that the N-pole and S-pole are alternately arranged and angularly spaced at regular intervals in the circumferential direction. Alternatively, permanent magnets 13a may be six of circular-arc-shaped magnets, each of which is separately magnetized to have the N-pole and the S-pole.

Next, as described above, rotor 14 is configured including armature 16 and shaft 15 that holds armature 16. In addition, armature 16 includes commutator 20 and armature core 17 on which windings 18 are wound.

Armature core 17 includes a plurality of teeth 17T that protrudes from core body part 17C fixed to shaft 15, in the outer peripheral direction. In addition, the armature core includes slots 17S, serving as spatial parts, that are formed alternately with tooth 17T in the circumferential direction. By utilizing the spaces of slots 17S respectively interposed between the teeth, winding 18 is wound on each of teeth 17T. Then, the winding of windings 18 on teeth 17T in this way results in the formation of armature coil 18L.

Commutator 20 includes segment group configured with a plurality of segments 25 that are arranged and angularly spaced at regular intervals, at the outer periphery of commutator body part 27 fixed to shaft 15. In addition, each of segments 25 has hook 26.

In the embodiment, as shown in FIG. 2, descriptions are made using the case where armature core 17 is equipped with eight teeth 17T. Moreover, in the embodiment, winding 18 is wound on each of teeth 17T to form a concentrated winding. That is, the winding is not a distributed winding in which a coil is formed over a plurality of the teeth but is the concentrated winding in which one coil is formed on one tooth. With this configuration, as shown in FIG. 2, armature 16 is such that armature coil 18L is formed including eight coil units 18W, i.e. coil units W1, W2, W3, W4, W5, W6, W7, and W8. Then, both winding-end portions of each of coil units 18W, formed as concentrated windings, are connected to respective hooks 26, as shown in FIG. 2.

Note that, in the specific configuration, each of coil units 18W is further connected using a jumper wire to be described later; however, FIG. 2 shows only the connections only between coil units 18W and hooks 26, for the sake of brevity. The detailed winding structure including the jumper wires will be described later. Moreover, hereinafter, descriptions will be made optionally letting the upper surface be the surface of one side of armature core 17 and letting the lower surface be the surface of the other side of armature core 17, where the upper surface is one on which commutator 20 is mounted. FIG. 2 shows stator 13 and rotor 14, as viewed from the top which is the upper surface side.

Figure 3:
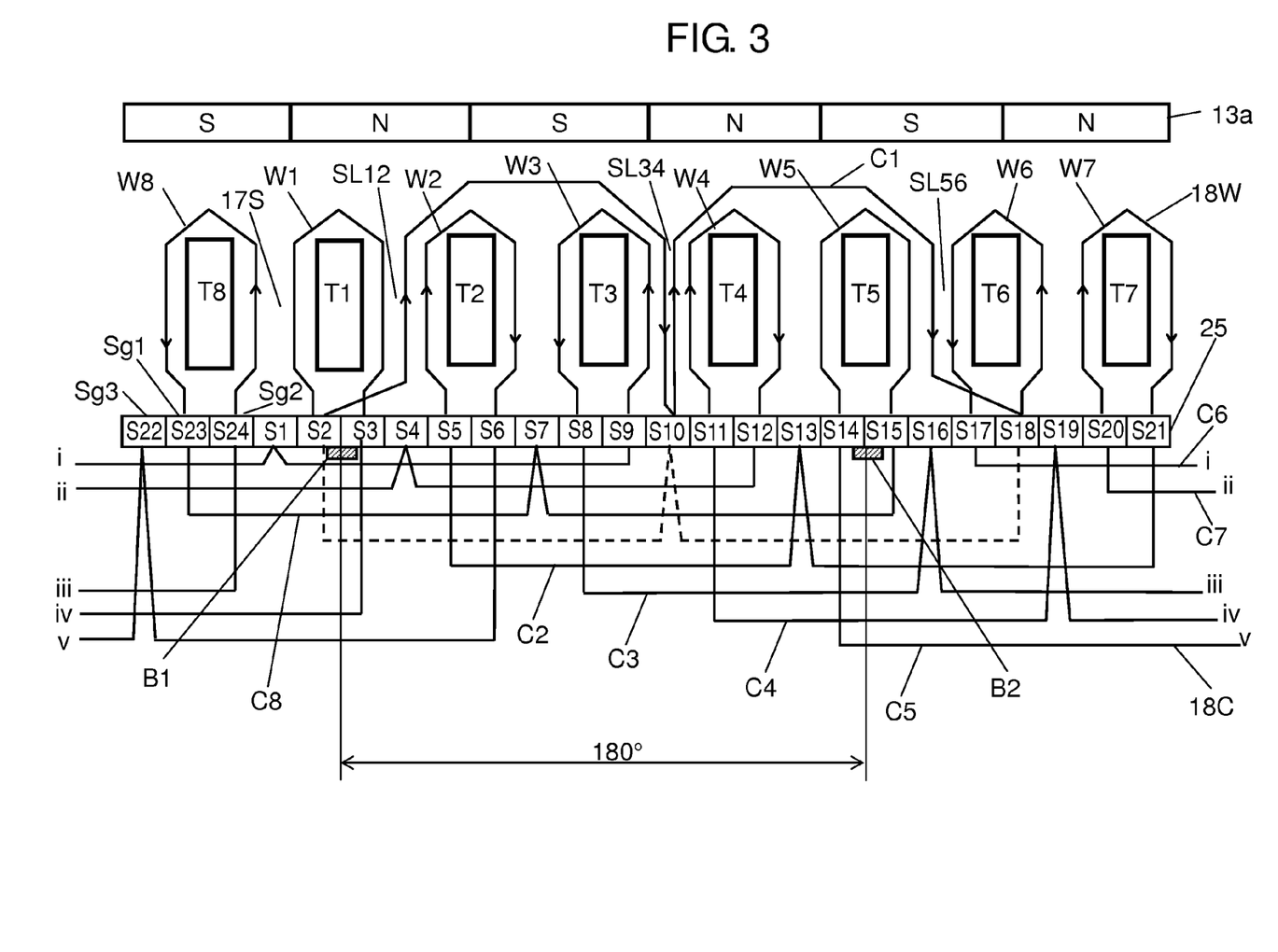
FIG. 3 is a developed view of windings, illustrating an example of wiring of the windings of the commutator motor.

FIG. 3 is a developed view of windings, illustrating an example of wiring of windings 18 of commutator motor 10 according to the embodiment. A specific example of wiring of the jumper wires will be described using FIG. 3.

Armature core 17 includes eight of teeth 17T, i.e. teeth T1, T2, T3, T4, T5, T6, T7, and T8, and includes slots 17S respectively interposed between teeth 17T, with the slots being the same in number as the teeth. Then, armature coil 18L is configured with eight coil units W1, W2, W3, W4, W5, W6, W7, and W8, and jumper wire units 18C. The eight coil units are formed with windings 18 in unit form. Jumper wire units 18C are a plurality of jumper wire units C1, C2, C3, C4, C5, C6, C7, and C8, which serves as jumper wires to interconnect between the coil units. Coil units W1, W2, W3, W4, W5, W6, W7, and W8 are each a concentrated winding, and windings 18 of the coil units are wound on teeth T1, T2, T3, T4, T5, T6, T7, and T8, respectively. For example, on tooth T1, winding 18 is wound plural times to form coil unit W1.

On the other hand, commutator 20 is equipped with twenty-four of the segments, i.e. from segment S1 to segment S24, serving as segments 25. Segments 25 are insulated from each other. The end of each of segments 25 is equipped with hook 26. When the end of coil unit 18W or jumper wire unit 18C is connected to each of segment 25, it is connected to hook 26 in the end of the segment; however, the connection will be optionally simply described as "connected to the segment," hereinafter.

Moreover, brush pieces 30 are configured with a pair of anode brush piece B1 and cathode brush piece B2 that are disposed and angularly spaced from each other at regular intervals of a machinery angle of 180 degrees. The brush pieces are in sliding contact with respective segments 25 of commutator 20. Then, these anode brush piece B1 and cathode brush piece B2 are configured to be connected to a direct current power supply, thereby supplying power to armature coil 18L via commutator 20. Note, however, that the angles referred hereinafter are the machinery angles.

Here, each of coil units 18W configuring armature coil 18L is connected to segments 25 adjacent to each other, as shown in FIG. 2. That is, one end of coil unit 18W is connected to one segment 25, while the other end is connected to the other segment 25 located adjacent to the one. Then, the segment located next to the adjacent segments 25 is not connected to coil unit 18W, but is connected only to jumper wire unit 18C. Details of this will be described later. Segment 25 connected to the one end of coil unit 18W is defined as a first segment; segment 25 connected to the other end of coil unit 18W is defined as a second segment. In addition, segment 25 connected only to jumper wire unit 18C is defined as a third segment. These arrangements are exemplified in FIGS. 2 and 3, where Sg1 is the first segment, Sg2 is the second segment, and Sg3 is the third segment.

Moreover, in the embodiment, commutator 20 is arranged such that the third segments are respectively located in front of slots 17S. That is, the third segments are disposed closer to the inner periphery of respective slot 17S than the first and second segments. More specifically, as indicated by dashed line segment Lcnt in FIG. 2, armature 16 is configured such that each of the third segments faces center 17Sc of the inner periphery of slot 17S, in the radial direction.

Then, in accordance which the definition described above, the first segment and the second segment are arranged adjacent to each other, and the third segment is arranged next to the adjacent arrangement. Moreover, armature coil 18L configures a closed series circuit, via the segment group and jumper wire units 18C. Then, the first segments, the second segments, and the third segments are the same in number. The total number of segments 25 of the segment group is equal to the sum of the numbers of the first segments, the second segments, and the third segments.

Further details of the arrangement of segments 25 are described as follows. In the embodiment, as shown in FIG. 3, the number of the segments of the segment group is 24; therefore, the segment pitch is an angle of 15 degrees. The segments are arranged at regular intervals such that an angle of 45 degrees is provided between adjoining two of first segments, adjoining two of second segments and adjoining two of third segments, that is, any of the first segments is arranged and angularly spaced from the next first segment at regular intervals of 45 degrees; any of the second segments is arranged and angularly spaced from the next second segment at regular intervals of 45 degrees; any of the third segments is arranged and angularly spaced from the next third segment at regular intervals of 45 degrees. Moreover, it is configured that, given any of the first segments, one of the second segment and the third segment is arranged at a location that is angularly spaced from the first segment at regular intervals of 120 degrees, and the other is arranged at another location angularly spaced at the regular intervals. In this manner subsequently, given any of the second segments, one of the third segment and the first segment is arranged at a location that is angularly spaced from the second segment at regular intervals of 120 degrees, and the other is arranged at another location angularly spaced at the regular intervals. Given any of the third segments, one of the first segment and the second segment is arranged at a location angularly spaced from the third segment at regular intervals of 120 degrees, and the other is arranged at another location angularly spaced at the regular intervals. Then, jumper wire units 18C mutually connect between the first segments, the second segments, and the third segments, respectively.

Next, the specific winding structure of armature coil 18L will be described. Coil unit W1 wound on tooth T1 is connected to first segment S2 and second segment S3. Coil unit W2 wound on tooth T2 is connected to first segment S5 and second segment S6. Coil unit W3 wound on tooth T3 is connected to first segment S8 and second segment S9. Coil unit W4 wound on tooth T4 is connected to first segment S11 and second segment S12. Coil unit W5 wound on tooth T5 is connected to first segment S14 and second segment S15. Coil unit W6 wound on tooth T6 is connected to first segment S17 and second segment S18. Coil unit W7 wound on tooth T7 is connected to first segment S20 and second segment S21. Coil unit W8 wound on tooth T8 is connected to first segment S23 and second segment S24.

Next, descriptions will be made regarding details of jumper wire units 18C that are connected to third segments S1, S4, S7, S10, S13, 516, 519, and S22. These jumper wire units 18C interconnect by wiring between coil units 18W to electrically connect between the coil units. These jumper wire units 18C mutually connect between the first segment, the second segment, and the third segment that are located and angularly spaced from each other at regular intervals of 120 degrees. Specifically, this is as follows.

Jumper wire unit C1 is connected to first segment S2, third segment S10, and second segment S18. Jumper wire unit C2 is connected to first segment S5, third segment S13, and second segment S21. Jumper wire unit C3 is connected to first segment S8, third segment S16, and second segment S24. Jumper wire unit C4 is connected to first segment S11, third segment S19, and second segment S3. Jumper wire unit C5 is connected to first segment S14, third segment S22, and second segment S6. Jumper wire unit C6 is connected to first segment S17, third segment S1, and second segment S9. Jumper wire unit C7 is connected to first segment S20, third segment S4, and second segment S12. Jumper wire unit C8 is connected to first segment S23, third segment S7, and second segment S15.

In this way, coil units 18W and jumper wire units 18C are connected to respective segments 25 in the manner described above, so that armature coil 18L configures a closed circuit. Specifically, when the circuit is traced in FIG. 3, starting from segment S1 in the direction toward segment S9, for example, the result is as follows: That is, S1-S9-W3-S8-S16-S24-W8-S23-S7-S15-W5-S14-S22-S6-W2-S5-S13-S21-W7-S20-S4-S12-W4-S11-S19-S3-W1-S2-S10-S18-W6-S17-S1, which shows one wire-connected loop that configures the closed circuit. That is, in the above description, although coil units 18W and jumper wire units 18C are separately described, it can be understood that such the wire-connected loop is formed with winding 18 consisting of one wire.

Each of jumper wire units 18C described above allows the streamlining of the number of man-hours needed for the wire connection, by employing the following method for connection. After having been connected to first segment S2, one end of coil unit W1 wound on tooth T1 is extended, without being cut there, and connected to third segment S10. Likewise, after having been connected to second segment S18, the other end of coil unit W6 wound on tooth T6 is extended, without being cut there, and connected to third segment S10. In this way, jumper wire unit C1 can be configured with both the extended wire of the one end of coil unit W1 and the extended wire of the other end of coil unit W6, which allows the streamlining of the number of man-hours needed for the wire connection. The same configuration as that of jumper wire unit C1 described above can be employed for jumper wire units C2, C3, C4, C5, C6, C7, and C8 as well. In accordance with the embodiment, based on such the method for wire connection, it is possible that armature coil 18L is formed even with winding 18 consisting of one wire.

Next, anode brush piece B1 and cathode brush piece B2 are disposed and angularly spaced from each other at regular intervals (180 degrees). Then, the circumferential width of each of brush piece B1 and brush piece B2 is set to be equal to or less than that of each of the segments. Accordingly, each of brush piece B1 and brush piece B2 is configured to be in sliding contact with adjacent two of the segments or one of the segments. The period of time during which the brush piece is in sliding contact with the one segment is so short that explanation of the period will be omitted in the following description.

As shown in FIG. 3, descriptions will be made regarding a flow of electric current in the state where anode brush piece B1 is in sliding contact with segments S2 and S3 while cathode brush piece B2, 180 degrees away from the anode brush piece, is in sliding contact with segments S14 and S15.

The current flowing in from segment S2 flows through coil unit W6 via segment S18, flows through coil unit W3 via segment S17 and segment S9, flows through coil unit W8 via segment S8 and segment S24, and flows out from segment S15 via segment S23. Likewise, the current flowing in from segment S3 flows through coil unit W4 via segment S11, flows through coil unit W7 via segment S12 and segment S20, flows through coil unit W2 via segment S21 and segment S5, and flows out from segment S14 via segment S6. The directions in which these currents flow are respectively indicated by the arrows in the coil units shown in FIG. 3.

As described above, the current flowing in from segment S2 flows through the series circuit including coil units W6, W3, and W8 and then flows out from segment S15, while the current flowing in from segment S3 flows through the series circuit including coil units W4, W7, and W2 and then flows out from segment S14. In this way, the current flowing in from anode brush piece B1 flows through the circuit in which the number of parallel circuits is two, and then flow out from cathode brush piece B2. With such the flow of the current, the commutator motor having the configuration is capable of self-starting.

Moreover, in the embodiment, the plurality of jumper wire units 18C is configured including jumper wire units 18C that pass through slots 17S to interconnect between coil units 18W. That is, each of jumper wire units 18C includes the wire connection as well in which the jumper wire unit is not wired to pass on the outer periphery of commutator 20, but is wound into slot 17S of armature core 17 together with respective coil unit 18W. With this configuration, the spaces inside slots 17S can be efficiently utilized without requiring any space for wiring additional jumper wire units 18C around commutator 20, resulting in the compact-size motor.

FIG. 3 shows one example, using the case of jumper wire unit C1, in which jumper wire unit 18C is wound into slots 17S to form the wire connection. Specifically, the figure shows the locations of slots SL12, SL34, and SL56, which serve as slots 17S that accommodate jumper wire unit C1. Jumper wire unit C1 starting from first segment S2, passes through slot SL12 between tooth T1 and tooth T2, passes through slot SL34 between tooth T3 and tooth T4, and is then connected to third segment S10. Then, the jumper wire unit starts from third segment S10, passes backward through slot SL34 between tooth T3 and tooth T4, passes through slot SL56 between tooth T5 and tooth T6, and is then connected to second segment S18.

Figure 4A:
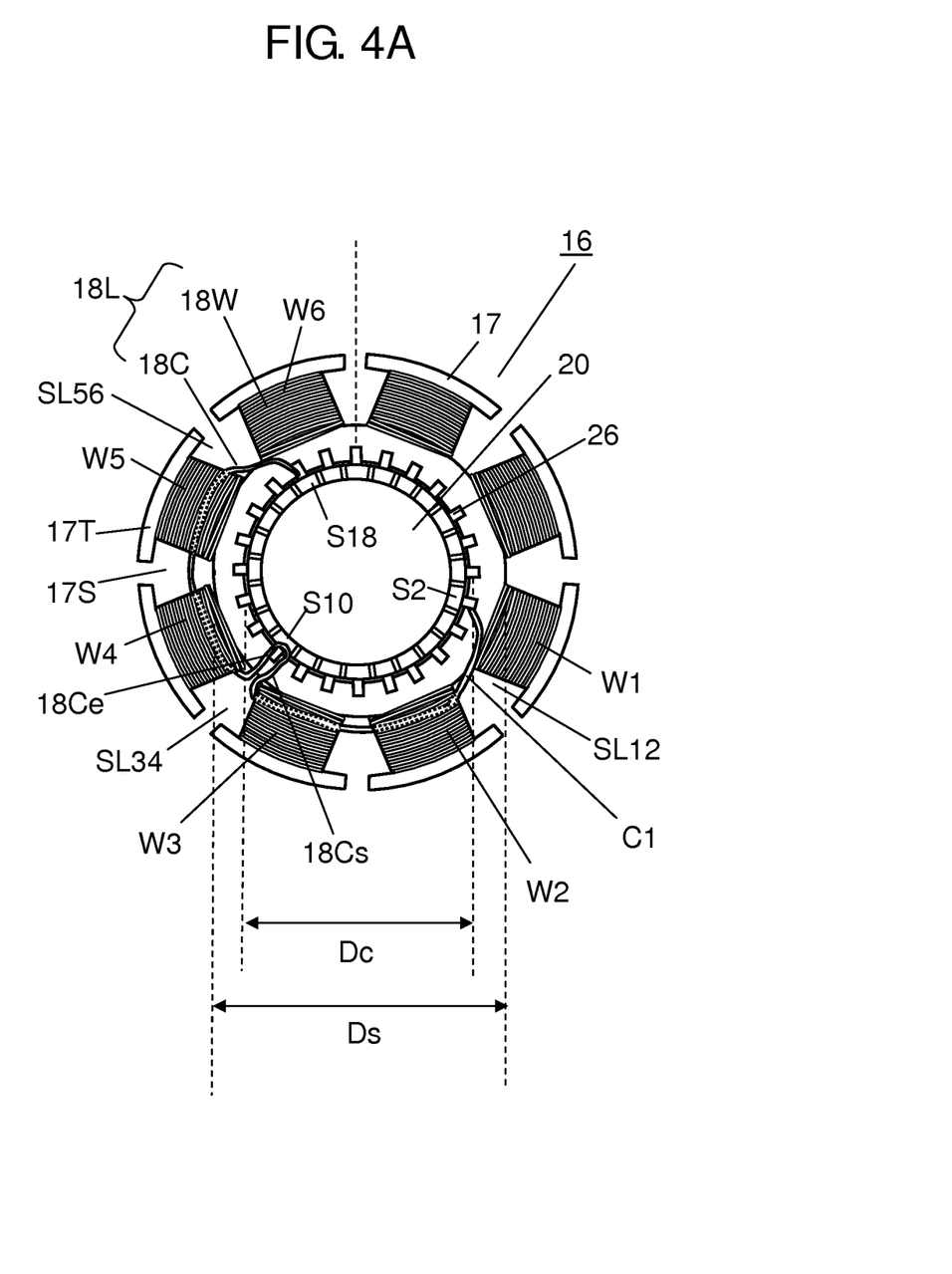
FIG. 4A is a top view illustrating a further specific example of a wire connection of a jumper wire unit in the commutator motor.
Figure 4B:
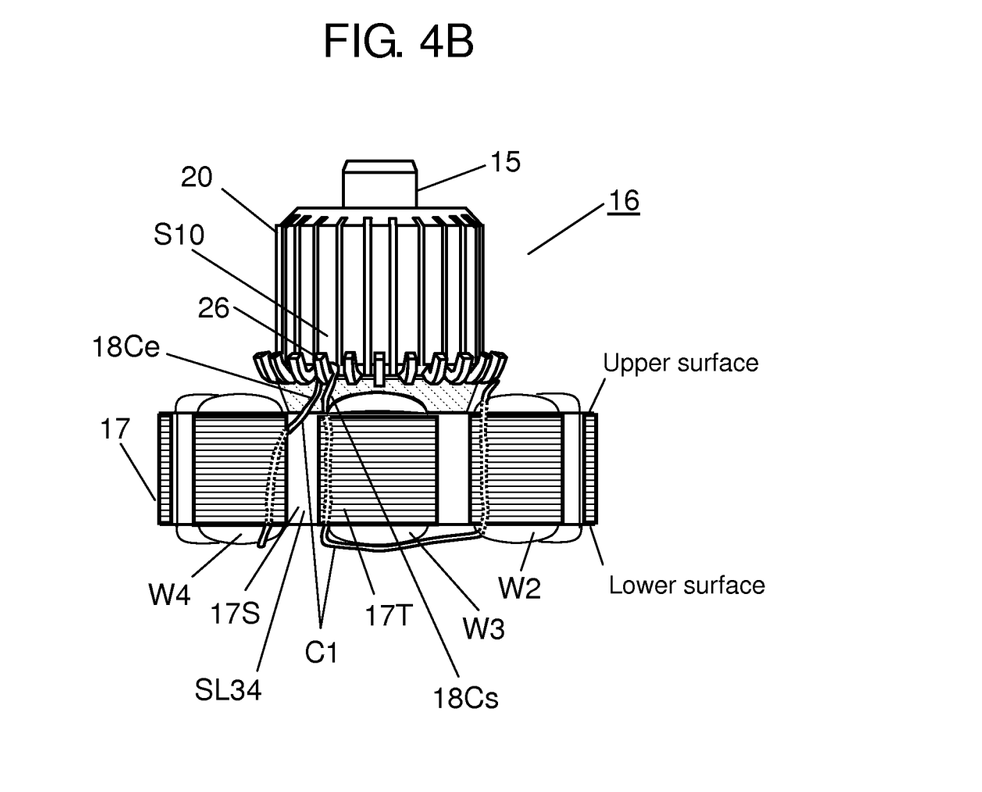
FIG. 4B is a side-elevational view illustrating the further specific example of the wire connection of the jumper wire unit in the commutator motor.

FIGS. 4A and 4B are views more specifically illustrating the wire connection of jumper wire unit C1 shown in FIG. 3. Of FIGS. 4A and 4B, FIG. 4A is a top view of armature 16, while FIG. 4B is a side-elevational view of armature 16. Note, however, that FIGS. 4A and 4B exemplify the wire connection of only jumper wire unit C1 in armature 16, for the sake of brevity.

As shown in FIGS. 4A and 4B, jumper wire unit C1 starting from first segment S2 disposed on the upper surface of armature core 17, passes through slot SL12 between coil unit W1 and coil unit W2 to reach the lower surface side of armature core 17.

Then, jumper wire unit C1 passes under the lower surface sides of coil unit W2 and coil unit W3 as indicated by the dashed line, passes through slot SL34 between coil unit W3 and coil unit W4, and then reaches the upper surface side to be connected to third segment S10.

Then, jumper wire unit C1 starting from third segment S10 passes backward through slot SL34 between coil unit W3 and coil unit W4 to reach the lower surface side of armature core 17.

Moreover, jumper wire unit C1 passes under the lower surface sides of coil unit W4 and coil unit W5 as indicated by the dashed line, passes through slot SL56 between coil unit W5 and coil unit W6, and then reaches the upper surface side to be connected to second segment S18.

As described above, although the description has been made regarding the wire connection of jumper wire unit C1 using FIGS. 4A and 4B, other jumper wire units 18C may be configured in the same manner. For example, jumper wire unit C2 starts from first segment S5, passes through slot 17S between coil unit W2 and coil unit W3, passes under the lower surface sides of coil unit W3 and coil unit W4, passes through slot 17S between coil unit W4 and coil unit W5, and then reaches the upper surface side to be hooked on hook 26 of third segment S13. Then, the jumper wire unit passes backward through slot 17S between coil unit W4 and coil unit W5 to reach the lower surface side, passes under the lower surface sides of coil unit W5 and coil unit W6, and then passes through slot 17S between coil unit W6 and coil unit W7 to be connected to second segment S21. As described above, although the description has shown the locations of slots 17S that each accommodate jumper wire unit C1 or C2, other jumper wire units C3, C4, C5, C6, C7, and C8 may be connected in the same manner.

Moreover, the configuration is preferably such that all of the plurality of jumper wire units 18C passes through slots 17S, as described above, to interconnect between coil units 18W. However, the configuration may be such that some of jumper wire units 18C interconnect between coil units 18W, only on the upper surface side of armature core 17. That is, the configuration is only required to be such that the plurality of jumper wire units 18C includes jumper wire unit 18C that passes through slots 17S to interconnect between coil units 18W. With this configuration, it is possible to suppress the increase in space needed for wiring jumper wire units 18C around the commutator as jumper wire units 18C become densely packed there. This allows the reduction in size of the continuous current motor.

In this way, commutator motor 10 according to the present invention includes the wire connection in which jumper wire unit 18C starting from the first or second segment passes through one of slots 17S to reach the opposite side of armature core 17, passes under the lower surface side of teeth 17T, and passes through another of slots 17S to reach the third segment.

Moreover, in the embodiment, as exemplified in the neighborhood of slot SL34 in FIGS. 4A and 4B, the configuration particularly includes the wire connection in which jumper wire unit 18C passes through slot 17S from the lower surface side to reach the third segment where the wire unit is hooked on the hook 26 of the third segment, and then passes backward through the same slot 17S to reach the lower surface side. In other words, in the wire connection of jumper wire unit 18C to the third segment, the wire connection is configured such that the two parts, i.e. wiring source side 18Cs and wiring destination side 18Ce, of jumper wire unit 18C pass through the same slot 17S together with each other. In this way, in the embodiment, each of the parts, i.e. one part running to one side (wiring source side 18Cs) and the other part running to the other side (wiring destination side 18Ce), of jumper wire unit 18C starting from the third segment is wired to pass through the same slot 17S together with each other so as to interconnect between coil units 18W.

Moreover, slot 17S through which the two parts, i.e. both sides of jumper wire unit 18C, pass in this way is set to be slot 17S located the closest to the third segment to which the jumper wire unit is connected. That is, as described above, in the embodiment, commutator 20 is disposed such that the third segment is located in front of (most closely to the inner peripheral side of) slot 17S; therefore, both wiring source side 18Cs and wiring destination side 18Ce of jumper wire unit 18C pass through slot 17S in front of the third segment.

In this way, in the embodiment, it is configured that both wiring source side 18Cs and wiring destination side 18Ce of jumper wire unit 18C connected to one of the third segments are drawn into slot 17S that is located closely facing the third segment in the front direction. For this reason, jumper wire unit 18C is not wired toward the segments adjacent to the third segment. In the embodiment, such the configuration allows the suppression of the occurrence of wire connection failures in which jumper wire units 18C come in contact with the hooks of the segments adjacent to the third segments, resulting in a reduction in the occurrence of insulation failures and short circuit failures. Moreover, because jumper wire unit 18C hooked on one of the third segments is wired into slot 17S located in front of the segment, the wire connection failures described above do not occur even in the configuration where diameter Dc of commutator 20 is close to inner-peripheral diameter Ds of the slots of armature core 17. For example, according to the embodiment, the configuration can be adopted even in the case where the difference (Ds–Dc) between diameter Dc of commutator 20 and inner-peripheral diameter Ds of the slots is not larger than 10 mm.

Moreover, in the embodiment, as shown in FIGS. 4A and 4B, when jumper wire unit 18C is connected to one of the third segments, jumper wire unit 18C is wired in a letter "U" motion and connected to hook 26 of the third segment in the U-shape. That is, in the embodiment, the wire unit is only required to be simply hooked in the U-shape, not wound in an α-shape, which allows the simplification of the method for wire connection. Moreover, both wiring source side 18Cs and wiring destination side 18Ce of jumper wire unit 18C that is hooked on hook 26 of the third segment, are disposed to be extended into slot 17S located in front of the segment. This allows the sufficiently-secured connection quality in terms of, such as, intimate contact between hooks 26 and windings 18.

Note that, in the above descriptions, although it was described that anode brush piece B1 and cathode brush piece B2 are disposed and angularly spaced at the interval of 180 degrees, they may be disposed and angularly spaced at an interval of 60 degrees. That is, cathode brush piece B2 is disposed and angularly spaced at an interval of 60 degrees relative to anode brush piece B1. In this case as well, in the wire connection of jumper wire unit 18C to one of the third segments, the connection may be configured such that the two parts, i.e. wiring source side 18Cs and wiring destination side 18Ce, of jumper wire unit 18C pass through slot 17S located in front of the third segment.

Moreover, in commutator motor 10 according to the embodiment, number T of the segments in the segment group is configured to equal the value that is a half of the value obtained by multiplying number P of magnetic poles of the field poles by number N of the coil units (equal to the number of the slots and the number of the teeth). That is, T=(½) PN. Number P of the magnetic poles is an even number which yields an odd number when it is divided by two. Number N of the coil units is an even number which is not any integral multiple of number P of the magnetic poles. Specifically, these values are as follows, which satisfy the above equation. That is, number T of the segments is 24, number P of the magnetic poles is 6, and number N of the concentrated-wound coil units is 8.

Moreover, coil units 18W and jumper wire units 18C are each configured with a conductor wire covered with an insulating layer. The thickness, materials, and the number of sublayers of the insulating layer are optionally selected in accordance with specifications of commutator motor 10. Moreover, in accordance with the specifications of commutator motor 10, the material of a conductor part, i.e. the core wire, of the conductor wire is optionally selected from copper, aluminum, copper alloy, aluminum alloy, alloy containing at least copper and aluminum, aluminum or aluminum alloy which contains trace amounts of impurities, magnesium alloy, and the like. In addition, the conductor wire covered with the insulating layer is optionally selected from a single-line wire, a double-line wire, a litz wire (a stranded wire), and the like, in accordance with the specifications of commutator motor 10.

As described above, the commutator motor according to the present invention is configured such that the plurality of the jumper wire units includes the jumper wire unit that interconnects between the coil units, by wiring the wire unit in such a manner that: Each of the parts, i.e. one part running to one side and the other part running to the other side, of the jumper wire unit starting from the third segment is wired to pass through the same slot together with each other.

Moreover, the method of connecting the windings includes wiring the jumper wire unit to interconnecting between the coil units in such a manner that: Each of the parts, i.e. one part running to one side and the other part running to the other side, of the jumper wire unit starting from the third segment is wired to pass through the same slot together with each other.

With such the configuration according to the present invention, the jumper wire unit is not wired in the directions toward the segments adjacent to the third segment, but is wired such that both the parts, i.e. the one part running to one side and the other part running to the other side, of the jumper wire unit pass through the same slot together with each other. This can suppress the occurrence of such the wire connection failures in which the jumper wire unit comes in contact with the hooks of the segments adjacent to the third segment, which results in the reduction in the occurrence of insulation failures of the windings and short circuit failures at the contact points in the armature.

INDUSTRIAL APPLICABILITY

The commutator motor according to the present invention is capable of reducing the occurrence of insulation failures of the windings and short circuit failures at the contact points in the armature. Consequently, the motor is preferably used for driving, for example, automotive electrical equipment, electrical power tools, and other equipment which requires high reliability.

The invention claimed is:
1. A commutator motor, comprising:
a stator including a plurality of field poles;
an armature including:
an armature core having a plurality of teeth and a slot between the teeth;
an armature coil formed of a winding wound on the armature core; and
a commutator having a segment group configured with a plurality of segments; and a brush in sliding contact with the segments for supplying electric power to the armature coil, the armature coil including:
- a plurality of coil units, each formed of the winding wound on the teeth; and
- a plurality of jumper wire units, each interconnecting electrically between the coil units, wherein the segment group includes:

a first segment connected with one end of one of the coil units;

a second segment connected with the other end of the one of the coil units; and a third segment connected only with one of the jumper wire units, both the first segment and the second segment being disposed in an adjacent arrangement to each other, the third segment being disposed next to the adjacent arrangement; and the plurality of the jumper wire units includes a jumper wire unit being wired such that each of one part of the jumper wire unit running to one side from the third segment and the other part of the jumper wire unit running to the other side from the third segment passes through the same slot to interconnect between the coil units.

2. The commutator motor according to claim 1, wherein the commutator is disposed such that the third segment is in front of the slot; and the each of the one part of the jumper wire unit running to the one side from the third segment and the other part of the jumper wire unit running to the other side from the third segment passes through the slot in front of the third segment.

3. The commutator motor according to claim 1, wherein each of the segments includes a hook; and
the jumper wire unit is connected with the hook of the third segment in a U-shape.

4. The commutator motor according to claim 1, wherein a difference between a diameter of the commutator and an inner-peripheral diameter of the slot of the armature core is not larger than 10 mm.

5. The commutator motor according to claim 1, wherein the armature coil is such that the coil units and the jumper wire units configure a closed series circuit via the segment group.

6. The commutator motor according to claim 1, wherein
the segment group includes an equal number of first segments, second segments and third segments; and
a number of the segments of the segment group equals a sum of the numbers of the first segments, the second segments and the third segments.

7. The commutator motor according to claim 1, wherein
relative to any of first segments, one of the second segment and the third segment is arranged at a location angularly spaced by 120 degrees;
relative to any of second segments, one of the third segment and the first segment is arranged at a location angularly spaced by 120 degrees; and
relative to any of third segment, one of the first segment and the second segment is arranged at a location angularly spaced by 120 degrees.

8. The commutator motor according to claim 1, wherein
the segments are arranged at regular intervals such that an angle of 45 degrees is provided between adjoining two of first segments, adjoining two of second segments and adjoining two of third segments.

9. The commutator motor according to claim 1, wherein
$$T=(1/2)PN$$
is satisfied where T is a number of the segments of the segment group, P is a number of magnetic poles of the field poles, and N is a number of the coil units of the armature coil.

10. The commutator motor according to claim 9, wherein
the number P of the magnetic poles is an even number which yields an odd number when divided by two; and
the number N of the coil units is an even number which is not any integral multiple of the number P of the magnetic poles.

11. The commutator motor according to claim 9, wherein the number P of the magnetic poles is six; the number N of the coil units is eight; and the number T of the segments is 24.

12. The commutator motor according to claim 1, wherein
the brush includes a pair of an anode brush and a cathode brush; and
the anode brush and the cathode brush are disposed and angularly spaced at an interval of one of 180 degrees and 60 degrees.

13. The commutator motor according to claim 1, wherein
the brush is in sliding contact with two of the segments adjacent to each other; and
the brush supplies the electric power to the armature coil as two circuits in parallel.

14. The commutator motor according to claim 1, wherein the armature coil is such that a material of a core wire of the wound winding is one of an alloy containing at least copper and aluminum, aluminum containing a trace amount of impurities, and an aluminum alloy containing a trace amount of impurities.

15. A method of connecting windings of a commutator motor, the commutator motor including:
- a stator including a plurality of field poles;
- an armature including:
  - an armature core having a plurality of teeth and a slot between the teeth;
  - an armature coil formed of a winding wound on the armature core; and
  - a commutator having a segment group configured with a plurality of segments; and
- a brush in sliding contact with the segments for supplying electric power to the armature coil, the armature coil including:
  - a plurality of coil units, each formed of the winding wound on the teeth; and
  - a plurality of jumper wire units, each interconnecting electrically between the coil units, the segment group including:
  - a first segment connected with one end of one of the coil units;
  - a second segment connected with the other end of the one of the coil units; and
  - a third segment connected only with one of the jumper wire units, both the first segment and the second segment being disposed in an adjacent arrangement to each other, the third segment being disposed next to the adjacent arrangement, the method comprising:

a step of interconnecting between the coil units with the jumper wire unit such that each of one part of the jumper wire unit running to one side from the third segment and the other part of the jumper wire unit running to the other side from the third segment passes through the same slot.

* * * * *